United States Patent [19]

Bai

[11] Patent Number: 5,502,127

[45] Date of Patent: * Mar. 26, 1996

[54] PROCESS FOR PRODUCTION OF HOMOGENEOUS POLYETHYLENE

[75] Inventor: Xinlai Bai, Piscataway, N.J.

[73] Assignee: Union Carbide Chemicals & Plastics Technology Corporation, Danbury, Conn.

[*] Notice: The portion of the term of this patent subsequent to Feb. 20, 2013, has been disclaimed.

[21] Appl. No.: 221,683

[22] Filed: Mar. 31, 1994

[51] Int. Cl.$^6$ .............................. C08F 4/68; C08F 236/20
[52] U.S. Cl. ................... 526/143; 526/144; 526/169.2; 526/336; 526/901; 526/904; 526/905
[58] Field of Search ........................ 526/129, 143, 526/144, 336, 901, 904, 905, 169.2

[56] References Cited

U.S. PATENT DOCUMENTS

| | | | |
|---|---|---|---|
| 3,671,506 | 6/1972 | Oshima et al. | 526/169.2 X |
| 3,969,331 | 7/1976 | Fauser | 526/169.2 X |
| 4,156,767 | 5/1979 | Hall | 526/143 X |
| 4,181,790 | 1/1980 | Maahs et al. | 526/143 |
| 4,508,842 | 4/1985 | Beran et al. | 502/112 |
| 4,882,406 | 11/1989 | Cozewith et al. | 526/336 |
| 4,892,853 | 1/1990 | Cann et al. | 502/112 |
| 5,082,908 | 1/1992 | Imai et al. | 526/143 |
| 5,342,907 | 8/1994 | Cann et al. | 526/129 |

FOREIGN PATENT DOCUMENTS

| | | |
|---|---|---|
| 0413530 | 2/1991 | European Pat. Off. . |
| 1519473 | 7/1978 | United Kingdom . |
| 2105355 | 3/1983 | United Kingdom . |

*Primary Examiner*—Fred Teskin
*Attorney, Agent, or Firm*—Saul R. Bresch

[57] ABSTRACT

A process for the production of a homogeneous polyethylene comprising contacting a mixture comprising ethylene, one or more alpha-olefins, and one or more unconjugated dienes, under polymerization conditions, with a catalyst system comprising:

(a) a catalyst precursor, in independent or prepolymer form, consisting of vanadium (acetylacetonate)$_3$;

(b) optionally, a support for said precursor;

(c) a cocatalyst consisting of an alkylaluminum halide having the formula $AlR_{(3-a)}X_a$ wherein each R is independently alkyl having 1 to 14 carbon atoms; each X is independently chlorine, bromine, or iodine; and a is 1 or 2; and (d) a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

with the proviso that sufficient unconjugated diene is present in the mixture to provide, in the homogeneous polyethylene, about 0.01 to less than about one percent by weight diene based on the weight of the homogeneous polyethylene.

7 Claims, No Drawings

PROCESS FOR PRODUCTION OF HOMOGENEOUS POLYETHYLENE

TECHNICAL FIELD

This invention relates to compositionally homogeneous polyethylenes having a narrow molecular weight distribution and a narrow comonomer distribution, and a process for their production.

BACKGROUND INFORMATION

Homogeneous polyethylenes are elastomeric copolymers used in such applications as hose and tubing, wire and cable, gaskets, and single ply roofing. They are usually formulated with fillers, oils, processing aids, and stabilizing agents. The homogeneous polyethylenes generally have a polydispersity (Mw/Mn) in the range of about 2 to about 3.5, and an essentially uniform comonomer distribution.

One of the catalyst systems selected to produce polyethylene in the gas phase on a commercial scale is described in U.S. Pat. No. 4,508,842. Typically, the catalyst system is comprised of a catalyst precursor, which is the reaction product of vanadium trichloride and an electron donor, the precursor being reacted with an aluminum containing modifier, and impregnated into a silica support; a promoter such as chloroform; and a triisobutylaluminum cocatalyst. This catalyst system produces a compositionally heterogeneous resin. It does achieve good particle morphology, but the non-uniform composition and broad molecular weight distribution results in polyethylene products with poor transparency and poor heat-sealing properties.

In United States Patent application Ser. No. 08/083,664 filed on Jun. 28, 1993 by Bai et al, a process is provided for the production of homogeneous polyethylenes, which are relatively free of these deficiencies. While this process is certainly advantageous, industry is desirous of producing homogeneous polyethylenes having superior strain hardening properties, which are so important, for example, in blown film tubular extrusion and other film blowing processes..

DISCLOSURE OF THE INVENTION

An object of this invention, therefore, is to provide a process for the production of such homogeneous polyethylenes having superior strain hardening properties. Other objects and advantages will become apparent hereinafter.

According to the present invention, the above object is met by a process for the production of a homogeneous polyethylene comprising contacting a mixture comprising ethylene, one or more alpha-olefins, and one or more unconjugated dienes, under polymerization conditions, with a catalyst system comprising:

(a) a catalyst precursor, in independent or prepolymer form, consisting of vanadium (acetylacetonate)$_3$;

(b) optionally, a support for said precursor;

(c) a cocatalyst consisting of an alkylaluminum halide having the formula $AlR_{(3-a)}X_a$ wherein each R is independently alkyl having 1 to 14 carbon atoms; each X is independently chlorine, bromine, or iodine; and a is 1 or 2; and (d) a promoter, which is a chlorinated ester having at least 2 chlorine atoms; a saturated or unsaturated aliphatic halocarbon having at least 3 carbon atoms and at least 6 halogen atoms; or a haloalkyl substituted aromatic hydrocarbon wherein the haloalkyl substituent has at least 3 halogen atoms.

With the proviso that sufficient unconjugated diene is present in the mixture to provide, in the homogeneous polyethylene, about 0.01 to less than about one percent by weight diene based on the weight of the homogeneous polyethylene.

DESCRIPTION OF THE PREFERRED EMBODIMENT(S)

The catalyst precursor is vanadium (acetylacetonate)$_3$, a known compound having one vanadium cation and three enolate anions prepared by conventional processes. It can also be referred to as vanadium triacetylacetonate.

As noted above, a support is optional. If used, the support can be silica, alumina, or polymeric; however, silica is preferred. Examples of polymeric supports are porous crosslinked polystyrene and polypropylene. A typical silica or alumina support is a solid, particulate, porous material essentially inert to the polymerization. It is used as a dry, powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of vanadium per gram of support and preferably about 0.4 to about 0.9 millimole of vanadium per gram of support. Impregnation of the above mentioned catalyst precursor into a silica support can be accomplished by mixing the precursor and silica gel in an inert solvent followed by solvent removal under reduced pressure.

Spray-drying technology can be used to generate well shaped catalyst precursors having little or no silica or other inorganic solids content.

The cocatalyst is an alkylaluminum halide having the formula $AlR_{(3-a)}X_{(a)}$ wherein each R is independently alkyl having 1 to 14 carbon atoms; each X is independently chlorine, bromine, or iodine; and a is 1 or 2. Alkylaluminum halides falling within the above formula include alkylaluminum mono- and dichlorides wherein each alkyl radical has 1 to 6 carbon atoms. Examples of the alkylaluminum halides are diethylaluminum chloride; ethylaluminum dichloride; ethylaluminum sesquichloride; di-nobutylaluminum chloride; diisobutylaluminum chloride; methylaluminum sesquichloride; isobutylaluminum sesquichloride; dimethylaluminum chloride; di-n-propylaluminum chloride; methylaluminum dichloride; and isobutylaluminum dichloride.

The cocatalyst can be present in the catalyst system in an amount of about 10 to about 500 moles of cocatalyst per gram atom of vanadium, and is preferably introduced in an amount of about 50 to about 150 moles of cocatalyst per gram atom of vanadium. In a fluidized bed process, the cocatalyst can be introduced in an amount of about 1000 to about 10,000 parts per million parts (ppm) by weight of resin present in the fluidized bed (note: resin includes initial resin used to provide the fluidized bed; resin produced; and fluidization aid, if any), and preferably in an amount of about 1500 to about 5000 parts per million parts of resin. About 0.01 to about 10 moles, and preferably about 0.1 to about 2 moles, of promoter can be used per mole of cocatalyst. In the fluidized bed process, the promoter can be introduced in an amount of about 500 to about 2500 parts per million parts (ppm) by weight of resin present in the fluidized bed plus, and preferably in an amount of about 800 to about 1400 parts per million parts of resin.

The promoter can be a chlorinated ester having at least 2 chlorine atoms or a perchlorinated ester. It can be impregnated into the support, if desired. Suitable esters are $Cl_3CCOOC_2H_5$ (ethyl trichloroacetate); $Cl_3CCOOCH_3$ (methyl trichloroacetate); $CCl_3CCl=CClCOOC_4H_9$; $C_6H_5CCl_2COOR$ wherein R is an alkyl radical having 1 to 8 carbon atoms; and $Cl_2C=CCl-CCl_2COOC_4H_9$. The promoter can also be a saturated aliphatic halocarbon having the formula $C_3(X)_a(F)_b(H)_c$ wherein each X is independently chlorine, bromine, or iodine; a is an integer from 6 to 8; b and c are integers from 0 to 2; and a+b+c equal 8. Examples of these halocarbon promoters are hexachloropropane, heptachloropropane, and octachloropropane. These saturated halocarbon promoters are mentioned in U.S. Pat. No. 4,892,853. In addition, the promoter can also be an unsaturated aliphatic halocarbon such as perchloropropene or any unsaturated halocarbon having a $CX_3$ group attached to a C=C group wherein each X is independently chlorine, bromine, or iodine, or a haloalkyl substituted aromatic hydrocarbon wherein the haloalkyl substituent has at least 3 halogen atoms such as trichlorotoluene, and trichloroxylene. Again, the halogen can be chlorine, bromine, or iodine. The number of carbon atoms in the halocarbon or the haloalkyl substituent can be 1 to 14, and the number of benzene rings in the aromatic hydrocarbon can be 1 to 3, but is preferably one.

As noted, the catalyst precursor can be impregnated into a support, if desired. In any case, the catalyst precursor, with or without the support, is dried. It can be introduced into the polymerization reactor in the supported form; as a liquid feed dissolved in a solvent; or in spray-dried form. The precursor is usually added prior to the introduction of the comonomers in a batch process, and continuously in a continuous process. The cocatalyst and promoter are preferably added separately neat or as solutions in an inert solvent, such as isopentane, to the polymerization reactor at the same time as the flow of ethylene is initiated. The promoter can also be impregnated into the support.

The catalyst precursor described above can be used in prepolymer form, if desired. A technique for prepolymerization can be found in U.S. Pat. No. 4,970,279. Typically, the prepolymerization is carried out in the liquid phase in a similar manner to a diluent slurry polymerization. The catalyst system used in the prepolymerization is the same one that will be used in the fluidized bed polymerization. The difference lies in the monomers used and weight ratio of monomer(s) to catalyst precursor, which is at least about 10:1, and is usually about 50:1 to about 300:1. It should be pointed out that the numbers vary with the particular catalyst system selected. Examples of suitable prepolymers are homoprepolymers of ethylene, ethylene/propylene coprepolymers, ethylene/1-hexene coprepolymers, ethylene/propylene/1-hexene terprepolymers, and ethylene/1-hexene/unconjugated diene terprepolymers. The prepolymer does not have to be the same as the resin product of the main polymerization although the ethylene/alpha-olefin/unconjugated diene terpolymer is preferred.

The amount of prepolymer formed, in terms of grams of prepolymer per gram of catalyst precursor, generally depends on the composition of the prepolymer, the composition of the polymer being produced, and the productivity of the catalyst employed. The prepolymer loading is chosen so as to minimize prepolymer residue in the product resin.

A typical prepolymerization can be carried out in a slurry prepolymerizer. The equipment includes a monomer feed system, a reaction vessel, and an inert screener. The reactor is a jacketed pressure vessel with a helical ribbon agitator to give good solids mixing, and with a bottom cone to facilitate solids discharge. Ethylene is fed from cylinders, with the pressure regulated, through 4A or 13X molecular sieves to remove impurities, and then through a flow meter to measure flow rate. Other olefins, if required, are fed from cylinders via a dip tube with nitrogen pressure supplied to the cylinder headspace. They also pass through 4A or 13X molecular sieves and through a flow meter. The monomers can be fed to either the reactor headspace or subsurface, with subsurface preferred as it increases the reaction rate by eliminating one mass transfer step. Temperature is controlled with a closed loop tempered water system. Pressure is controlled with a vent/make-up system.

The finished prepolymerized catalyst is screened to remove skins, agglomerates, and other types of oversize particles that could cause feeding difficulties into the gas phase reactor. The screening is done with a vibratory screener with a 20 mesh screen. The screener is kept under a nitrogen atmosphere to maintain the prepolymerized catalyst activity. Oversize material is collected for disposition. The desired undersize fraction is discharged into a cylinder for storage and shipping.

As noted, the typical prepolymerization is a slurry polymerization of ethylene and, optionally, a comonomer. Isopentane, hexane, and heptane can be used as the solvent, with isopentane preferred for its higher volatility. The prepolymerization temperatures can be in the range of about 25° to about 70° C. Monomer partial pressures are about 15 to about 40 psi, and levels of cocatalyst and catalyst promoter are about 1 to about 5 moles per mole of vanadium. The prepolymer loading ranges from about 10 to about 500 grams per gram of supported catalyst precursor, preferably from about 50 to about 300 grams per gram. The comonomer content of the prepolymer ranges from 0 to 15 weight percent. Hydrogen, or other chain transfer agents, can be added at the start of polymerization or throughout the polymerization to control molecular weight. Additional olefins or dienes may also be added. When the polymerization is complete, the agitator is stopped and the solids are allowed to settle so that the excess solvent can be removed by decanting. The remaining solvent is removed by drying, using low temperatures to avoid catalyst decay. The dried prepolymer catalyst is discharged to a storage cylinder through an inert screener, to remove oversize (+20 mesh) material. The polymerization can be conducted in a solution or in a slurry as described above for the prepolymerization, or in the gas phase, preferably in a fluidized bed. As noted, the process of this invention can be carried out in one or two or more reactors connected in series, also referred to as staged reactors or a multistage process. It will be understood that the definition of "two or more reactors connected in series" includes one reactor operated in two or more stages.

The fluidized bed can be a stirred fluidized bed reactor or a fluidized bed reactor, which is not stirred. In terms of the fluidized bed, a superficial velocity of about 1 to about 4.5 feet per second and preferably about 1.5 to about 3.5 feet per second can be used. The total reactor pressure can be in the range of about 150 to about 600 psia and is preferably in the range of about 250 to about 500 psia. The ethylene partial pressure can be in the range of about 25 psi to about 350 psi and is preferably in the range of about 80 psi to about 250 psi. The temperature of the polymerization can be in the range of about 0° C. to about 100° C. The gaseous feed streams of ethylene, alpha-olefin, and hydrogen(or another chain transfer agent) are preferably fed to the reactor recycle line while the unconjugated diene and the cocatalyst solution are preferably fed directly to the fluidized bed reactor to enhance mixing and dispersion. The prepolymer containing the catalyst precursor is transferred into the fluidized bed from the catalyst feeder. The composition of the polymer product can be varied by changing the alpha-olefin/ethylene molar ratio in the gas phase and the diene concentration in the fluidized bed. The product is intermittently discharged from the reactor as the bed level builds up with polymerization. The production rate is controlled by adjusting the catalyst feed rate.

The polyethylenes are, generally, copolymers of ethylene, one or more alphaoolefins having 3 to 12 carbon atoms, and preferably 3 to 8 carbon atoms, and a small amount of an unconjugated diene. The unconjugated diene can have 5 to 20 carbon atoms and preferably has 5 to 12 carbon atoms. Examples of the alpha-olefins are propylene, 1-butene, 1-hexene, 4-methyl-1-pentene, and 1-octene. Examples of the unconjugated dienes are 1,7-octadiene, 1,4-pentadiene, 1,5-hexadiene, and 1,6-heptadiene. As noted, these polyethylenes are homogeneous. Such polyethylenes are characterized by narrow molecular weight distributions, e.g., Mw/Mn ratios of about 2 to about 3.5, and narrow comonomer distributions, i.e., preferably as close to uniform as possible. The molar ratio of monomers in the reactor will be different for different catalyst systems, as is well-known to those skilled in the art. The alpha-olefin/ethylene molar ratio is adjusted to control the level of alpha-olefin incorporated into the polymer. The propylene/ethylene ratio can be in the range of about 0.05:1 to about 2.5:1 and is preferably in the range of about 0.25:1 to about 1.5:1. The 1-hexene/ethylene molar ratio can be in the range of about 0.005:1 to about 0.050:1 and is preferably in the range of about 0.008:1 to about 0.012:1. The hydrogen/ethylene molar ratio is adjusted to control average molecular weights of the copolymer. The unconjugated diene is present in the range of about 0.01 to about less than about one percent by weight based on the weight of the copolymer, and is preferably present in the range of about 0.1 to about 0.8 weight percent.

Steps can be taken to reduce agglomeration. For example, fluidization aids can be provided as described in U.S. Pat. No. 4,994,534. Also, the product discharge line between the reactor and the product pot is often plugged up with chunks between intervals of product drops. A continuous purge flow of nitrogen in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, quick change of gas composition, selective use of static-neutralizing chemicals, and surface passivation with aluminum alkyls.

Static can also be controlled by using small amounts of an inert conductive particulate material such as carbon black. The amount of inert particulate material is that which is sufficient to control static, i.e., about 0.5 to about 1.5 percent by weight based on the weight of the fluidized bed. Carbon black is the preferred antistatic material. The mean particle size of the inert conductive particulate material is in the range of about 0.01 to about 150 microns, preferably to about 10 microns. The mean particle size can refer to the particle per se or to an aggregate as in the case of carbon black. The carbon black materials employed can have a primary particle size of about 10 to about 100 nanometers and an average size of aggregate (primary structure) of about 0.1 to about 10 microns. The surface area of the carbon black can be about 30 to about 1500 square meters per gram and can display a dibutylphthalate (DBP) absorption of about 80 to about 350 cubic centimeters per 100 grams. It is preferred to treat the particulate material prior to its introduction into the reactor to remove traces of moisture and oxygen. This can be accomplished by purging the material with nitrogen gas, and heating using conventional procedures. Other antistatic agents are also found to be effective in keeping the static level under control as mentioned, for example, in U.S. Pat. No. 5,194,526.

The residence time of the mixture of comonomers, resin, catalyst, and liquid in the fluidized bed can be up about 8 hours and is preferably no more than about 4 hours. The final product can contain the following amounts of reacted comonomers: about 35 to about 80 percent by weight ethylene; about 18 to about 50 percent by weight alpha-olefin; and about 0.01 to less than about one percent by weight unconjugated diene.

The fluidized bed reactor can be the one described in U.S. Pat. No. 4,482,687 or another conventional reactor for the gas phase production of polyethylene. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas is comprised of ethylene, nitrogen, hydrogen, and alpha-olefin, either alone or in combination. The process can be carried out in a batch or continuous mode, the latter being preferred. The essential parts of the first reactor are the vessel, the bed, the gas distribution plate, inlet and outlet piping, a compressor, a cycle gas cooler, and a product discharge system. In the vessel, above the bed, there is a velocity reduction zone, and in the bed, a reaction zone. Both are above the gas distribution plate.

Variations in the reactor can be introduced if desired. One involves the relocation of the cycle gas compressor from upstream to downstream of the cooler and another involves the addition of a vent line from the top of the product discharge vessel (stirred product tank) back to the top of the reactor to improve the fill level of the product discharge vessel.

The advantages of the prior invention are found in the production of homogeneous polyethylene resins having narrow molecular weight and comonomer distributions, the products of which have very good transparency and heat-sealing properties. The advantages of this invention, not only incorporate the advantages of the prior invention, but permit compositionally homogeneous polyethylenes to be produced to the essential exclusion of the corresponding compositionally heterogeneous resins. Further, the homogeneous resins are made under low pressure conditions, but exhibit the properties of a polyethylene made under high pressure. These advantages can be achieved in a single reactor or in two or more staged reactors. The two stage embodiment of this invention produces bimodal molecular weight distribution resins with homogeneous compositional distribution. This results in superior resin strength and extrusion characteristics in addition to the good transparency and heat sealing properties. Finally, the resins produced by subject process exhibit significant increases in strain hardening behavior, which make them excellent candidates for film blowing processes.

The patents and patent applications mentioned in this application are incorporated by reference herein.

The invention is illustrated by the following examples.

EXAMPLES 1 to 7

In the examples, the reactor used for the preparation of the catalyst precursor and the polymerization is a stirred reactor. The polymerization is carried out in a hexane slurry. The catalyst system for the polymerization includes a vanadium based catalyst precursor; a cocatalyst; and a promoter.

Polymerization

To a one liter stirred batch reactor is charged, under nitrogen, 500 milliliters of dry hexane. The catalyst precursor is then charged, followed by a one time batch charge of 1-hexene and 1,7-octadiene, and hydrogen for molecular weight control. The reactor is pressurized at the desired reaction temperature with ethylene to establish a gas composition of particular molar ratio. The promoter is charged and the reactor solution temperature is lowered 5° to 10° C. before the addition of the cocatalyst. The cocatalyst is added and the reactor solution is brought up to the desired temperature. At the end of a reaction period of 30 minutes, ethanol is injected into the reaction solution to quench the polymerization reaction. The polymer is isolated by coagulation in methanol followed by filtration.

Catalyst activity is determined by mass balance, and the polymer composition is determined by nuclear magnetic resonance (NMR) analysis. Variables and results are set forth in the Table. It can be seen that under the same reaction conditions, with the increase of unconjugated diene in the reaction mixture, the flow index (FI) or melt index (MI) are significantly decreased. This indicates that crosslinking takes place and it increases with the amount of diene incorporated. The incorporation of unconjugated diene slightly broadens resin molecular weight distribution (Mw/Mn) reflecting the increase of weight average molecular weight, but does not have any negative effect on catalyst activity. The resin density does not change much with the increase of diene incorporation. This indicates that the incorporation of small amounts of unconjugated dienes do not affect the incorporation of 1-hexene. Diene and hydrogen have independent and opposing effects on flow index. In other words, the increase in molecular weight by incorporation of diene can be well regulated with hydrogen.

The Extensional Rheology test measures the increase in strain hardening behavior. The test is carried out as follows:

Each sample is prepared first by compression molding loose polyethylene resin into a plaque 1.52 millimeters thick. In order to relax any stresses or orientation in the polymer, the sample is further compressed for several hours at 180° C. to 1.27 millimeters thickness under vacuum. An annular section is punched out 1 centimeter across, and the difference between inner and outer diameters for each sample is 2.54 millimeters.

Evidence of strain hardening in each sample is determined by measuring extensional viscosity, which is calculated as the quotient between the extensional stress and the extension rate of the sample. Each sample is placed between two hook clamps, which are attached to a commercial servo-controlled tensile machine modified for handling molten samples. One clamp moves relative to the other at programmed speeds. The apparatus is capable of developing up to 200 inches per minute controlled crossed-head speed with a displacement of 20 inches. Special clamping is incorporated to allow a 0 to 500 grams load cell to be used for the tensile stress measurement.

Each sample is heated in a hot oil bath to 150° C. before stretching. To establish a constant extensional deformation rate, an exponentially increasing stretching speed is needed, and this is achieved electronically using a signal generator. Each sample maintains a fairly uniform cross-section during stretching.

The results of the stretching experiment are collected as force on the sample as a function of crosshead displacement. Using time as the independent variable can lead to large errors in the stress if the crosshead does not follow exactly the chosen exponential path. A data sheet for the recording of essential information and a simple program are used to reduce the data to extensional viscosity versus time. These data are then plotted in the classical fashion: Log of extensional viscosity versus log of time with rate as a parameter.

It can be seen that samples containing a small amount of diene exhibit strain hardening, evidenced by an upward inflection in viscosity-time function at high strain rates. The level of strain hardening of one sample is higher than that of another sample. This correlates with the amount of 1,7-octadiene used in the polymerization, i.e., the higher the diene level, the greater the strain hardening; however, an upper limit must be observed as will be noted below. Samples do not show strain hardening when no diene is used in the polymerization.

Strain hardening is believed to be caused by intermolecular entanglements which lengthen the relaxation time of a polymer melt subjected to strain. Polymers that exhibit strain hardening are better suited to certain types of extrusion apparatus, e.g., film blowing, than those that do not.

The comparison of the extensional viscosity of a sample (an embodiment of the invention) with that of commercial high pressure low density polyethylene and commercial linear low density polyethylene (no diene) with similar melt index and density indicates that the strain hardening behavior of the sample is very similar to that of the high pressure low density polyethylene and that the linear low density polyethylene does not show any strain hardening. The similarity in strain hardening behavior of the product made with the process of this invention and the high pressure low density polyethylene implies that the instant product would have similar processibility to that of the high pressure low density polyethylene. Meanwhile, the linear structure of the product made with the process of this invention offers the strength of the conventional linear low density polyethylene.

Examples 1 to 7 summarize the ethylene, 1-hexene, and 1,7-octadiene terpolymerization conditions and the product properties with a V(AcAc)3/DEAC/ETCA catalyst system. 5 micromoles of V(AcAc)3 are used; the DEACN molar ratio is 300; the ETCAN molar ratio is 10; the reaction temperature is 35° C.; the total pressure is 100 psi; and 1-hexene is introduced in an amount of 60 milliliters. It can be seen that under the same reaction conditions, with the increase of unconjugated diene in the reaction mixture, the flow index (FI) or melt index (MI) is significantly decreased. This indicates that crosslinking takes place and it increases with the amount of diene incorporated. The incorporation of unconjugated diene slightly broadens resin molecular weight distribution (Mw/Mn) reflecting the increase of weight average molecular weight, but does not have any negative effect on catalyst activity. The resin density does not change much with the increase of diene incorporation. This indicates that the incorporation of small amounts of unconjugated dienes does not affect the incorporation of 1-hexene. Diene and hydrogen have independent and opposing effects on flow index. In other words, the increase in molecular weight by incorporation of diene can be well regulated with hydrogen (example 5 vs. example 4 and example 7 vs. example 6).

The Extensional Rheology test is applied to resins made in examples 1, 5, and 7 where the amount of hydrogen is increased in order to make resins with a reasonable flow index, which is decreased by incorporating diene. The test shows that there are significant increases in strain hardening in examples 5 and 7. Strain hardening is evidenced by an upward inflection in viscosity/time function at high strain rates. The level of strain hardening is higher in example 7 than in example 5. This indicates a correlation with the amount of diene introduced, i.e., 1 milliliter vs. 0.5 milliliter, respectively. Example 7 shows a degree of strain hardening, which is unusual. Not only does the strain hardening increase in an accelerating manner but the resisting force on the thinning sample continues to increase with deformation. Such behavior is theoretically associated with exceptionally stable drawing processes (avoidance of draw resonance). Such a material would have both low neck-in (associated with high elasticity) and good properties (related to the base linear structure). Example 1 shows no strain hardening since no diene is incorporated into the copolymer.

Low Mw/Mn values indicate that the molecular weight distribution is narrow, and low melting points of the resins indicate that the comonomer distribution is also narrow.

In general, it is important not to incorporate enough unconjugated diene to cause extensive in-situ crosslinking, as this will cause gel formation and ultimately, the formation of infusible, insoluble material. Therefore, it is recommended that the final product contain less than about 1 percent by weight unconjugated diene.

TABLE

| Example | H2 (psi) | diene (ml) | activity | density (g/cc) | MI (g/10 min) | FI (g/10 min) | Mw Mn | MP (°C.) |
|---|---|---|---|---|---|---|---|---|
| 1 | 3 | 0 | 7546 | 0.922 | 1.9 | 43 | 2.2 | 113 |
| 2 | 3 | 0.1 | 7534 | 0.922 | 0.36 | 12 | 2.2 | 112 |
| 3 | 3 | 0.3 | 6676 | 0.920 | — | 5.2 | 2.7 | — |
| 4 | 3 | 0.5 | 6594 | 0.927 | — | 2.3 | 3.1 | 114 |
| 5 | 10 | 0.5 | 7240 | 0.926 | 0.43 | 28 | — | 111 |
| 6 | 3 | 1 | 6379 | 0.922 | — | — | — | 110 |
| 7 | 17 | 1 | 5749 | 0.922 | 0.18 | 22 | — | 111 |

Notes to Examples and Table:

1. V=vanadium
V(AcAc)3=vanadium (acetylacetonate)$_3$
DEAC=diethylaluminum chloride
ETCA=ethyl trichloroacetate
H2 =hydrogen
psi=pounds per square inch
ml=milliliter(s)
g/cc=gram per cubic centimeter
MP=melting point in °C.

2. Activity = the grams of C2/C6/1,7-octadiene terpolymer produced per millimole of vanadium per hour per 100 psi of C2.

3. MI(g/10 rain) = melt index is reported in grams per 10 minutes. It is determined under ASTM D-1238, Condition E, at 190° C. and 2.16 kilograms.

4. FI(g/10 min) = flow index is reported in grams per 10 minutes. It is determined under ASTM D-1238, Condition F, at 190° C. and 21.6 kilograms.

5. Mw/Mn = polydispersity, a measure of the breadth of the molecular weight distribution. The ratio represents weight average molecular weight divided by number average molecular weight.

I claim:

1. A process for the production of a homogeneous polyethylene having a polydispersity in the range of about 2 to about 3.5 and an essentially uniform comonomer distribution comprising contacting a mixture comprising ethylene, one or more alpha-olefins, each having 4 to 8 carbon atoms, and one or more unconjugated dienes, under polymerization conditions, with a catalyst system comprising:

(a) a catalyst precursor, in independent or prepolymer form, consisting of vanadium (acetylacetonate)$_3$;

(b) optionally, a support for said precursor;

(c) a cocatalyst consisting of an alkylaluminum halide having the formula $AlR_{(3-a)}X_a$ wherein each R is independently alkyl having 1 to 14 carbon atoms: each X is independently chlorine, bromine, or iodine; and a is 1 or 2; and (d) a promoter, which is a chlorinated ester having at least 2 chlorine atoms, with the proviso that sufficient unconjugated diene is present in the mixture to provide, in the homogeneous polyethylene, about 0.01 to about 0.8 percent by weight diene based on the weight of the homogeneous polyethylene.

2. The process defined in claim 1 wherein the unconjugated diene is present in the mixture in an amount sufficient to provide, in the homogeneous polyethylene, about 0.1 to about 0.8 percent by weight diene based on the weight of the homogeneous polyethylene.

3. The process defined in claim 1 wherein the unconjugated diene is 1,7-octadiene.

4. The process defined in claim 1 wherein the cocatalyst is diethylaluminum chloride or diisobutylaluminum chloride.

5. The process defined in claim 1 wherein the promoter is ethyl trichloroacetate.

6. The process defined in claim 1 wherein the process is carried out in the gas phase in one or more fluidized beds.

7. A process for the production of a homogeneous polyethylene having a polydispersity in the range of about 2 to about 3.5 and an essentially uniform comonomer distribution comprising contacting a mixture comprising ethylene, one or more alpha-olefins, each having 4 to 8 carbon atoms, and one or more unconjugated dienes having 5 to 12 carbon atoms, in the gas phase in one or more fluidized beds, under polymerization conditions, with a catalyst system comprising:

(A) a catalyst precursor, in independent or prepolymer form, consisting of vanadium (acetylacetonate)$_3$;

(B) optionally, a support for said precursor;

(C) a promoter consisting of ethyl trichloroacetate; and (D) a cocatalyst consisting of diethylaluminum chloride or diisobutylaluminum chloride with the proviso that sufficient unconjugated diene is present in the mixture to provide, in the homogeneous polyethylene, about 0.1 to about 0.8 percent by weight diene based on the weight of the homogeneous polyethylene.

* * * * *